Aug. 24, 1965
R. J. REED
3,202,159
CAR-TOP TENT STRUCTURE
Filed June 4, 1962
4 Sheets-Sheet 1
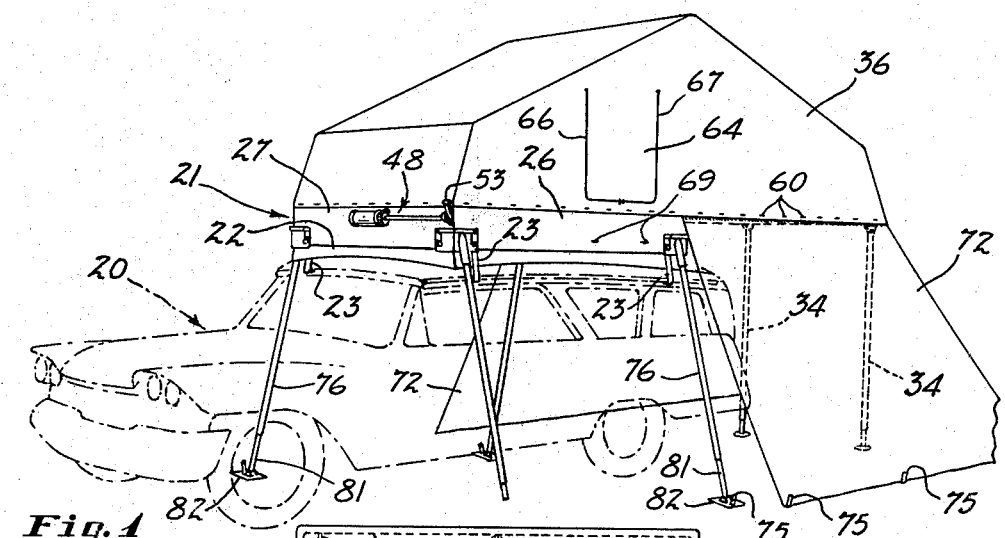
Fig. 1
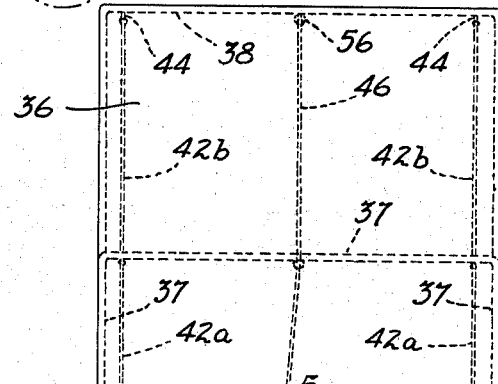
Fig. 2
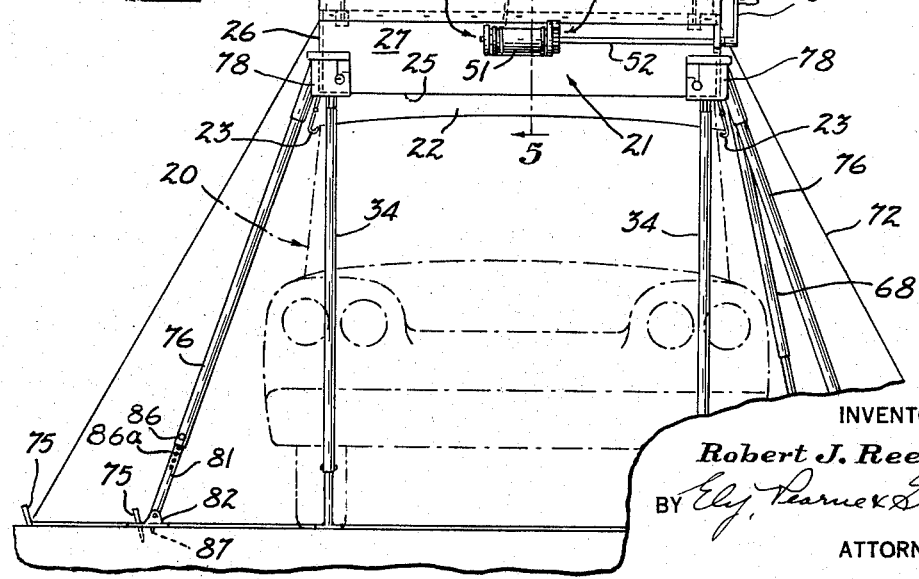
INVENTOR
Robert J. Reed
BY Ely, Pearne & Gordon
ATTORNEYS Aug. 24, 1965
R. J. REED
3,202,159
CAR-TOP TENT STRUCTURE
Filed June 4, 1962
4 Sheets-Sheet 2
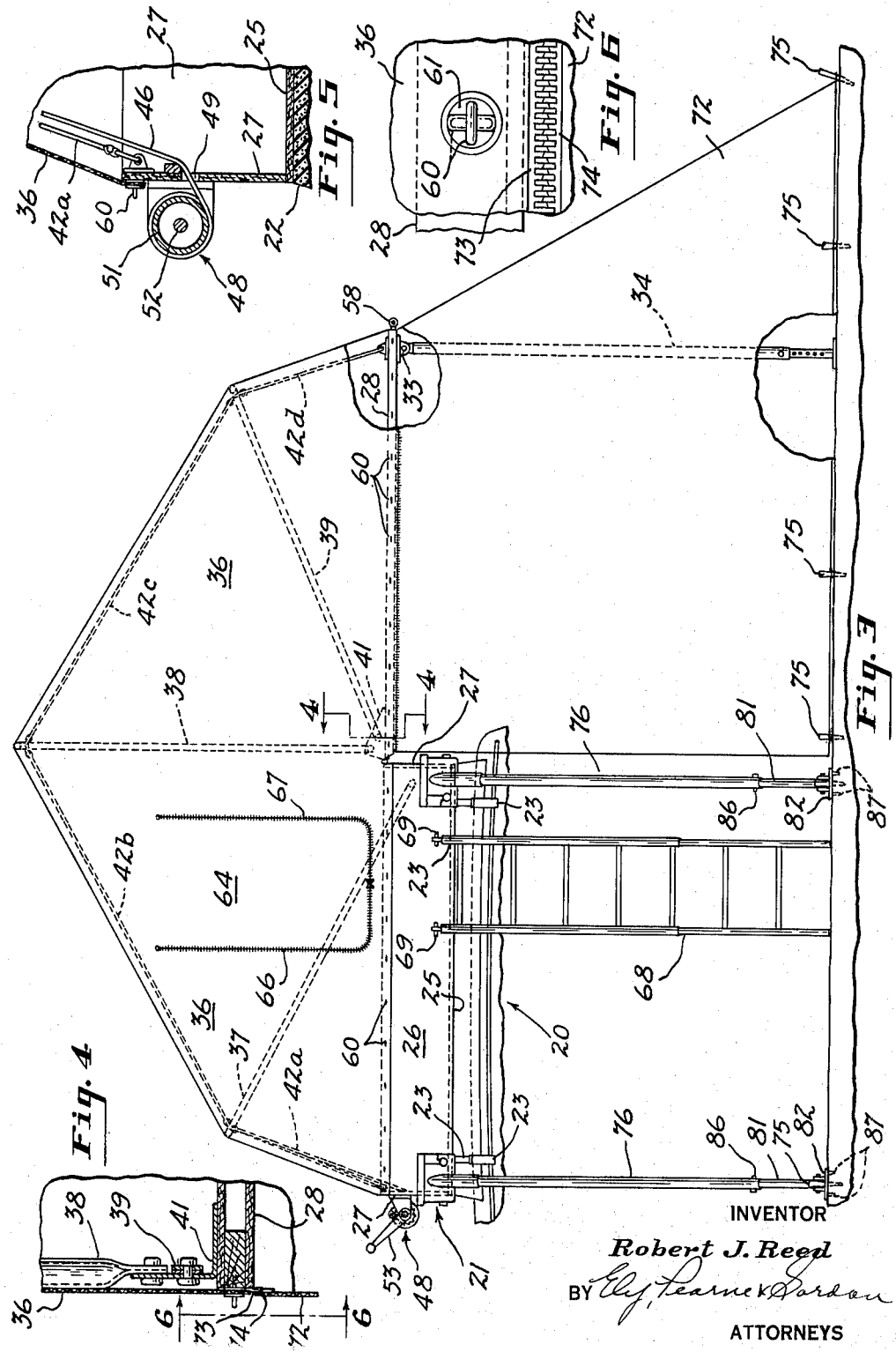
INVENTOR
Robert J. Reed
BY
ATTORNEYS Aug. 24, 1965
R. J. REED
3,202,159
CAR-TOP TENT STRUCTURE
Filed June 4, 1962
4 Sheets-Sheet 3
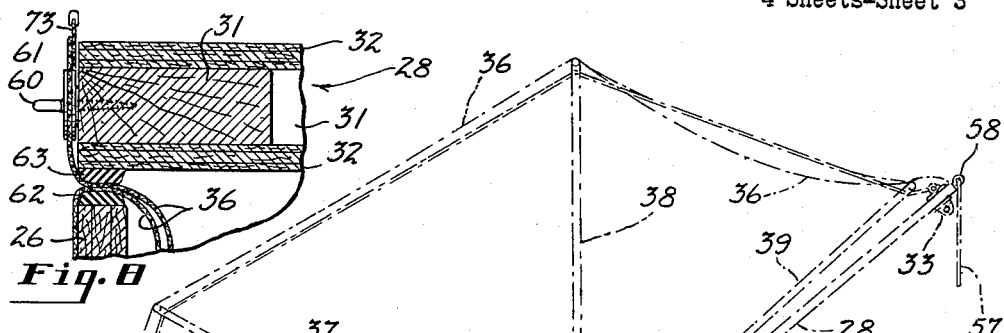
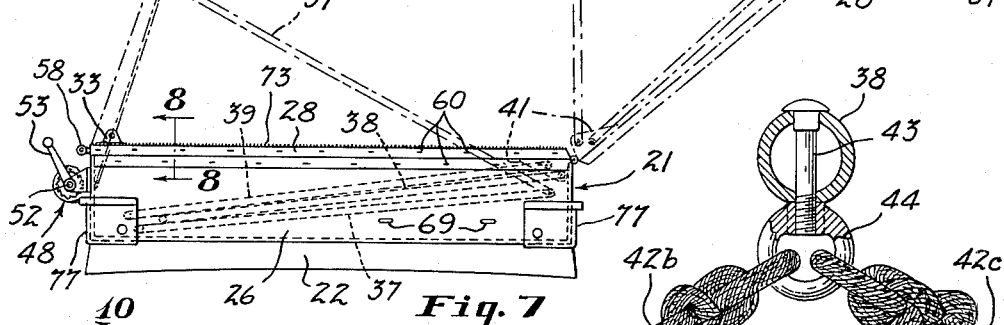
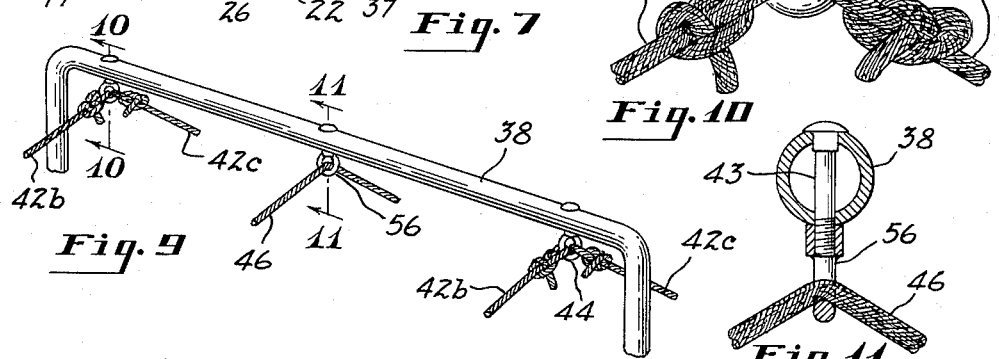
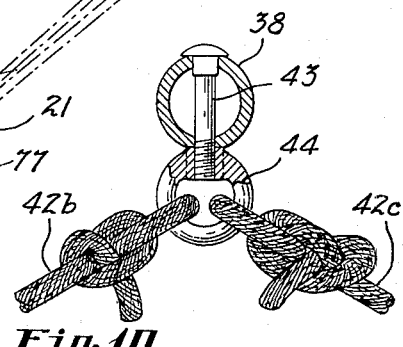
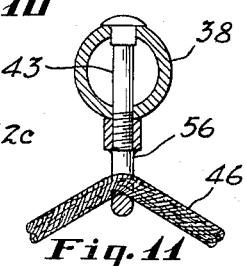
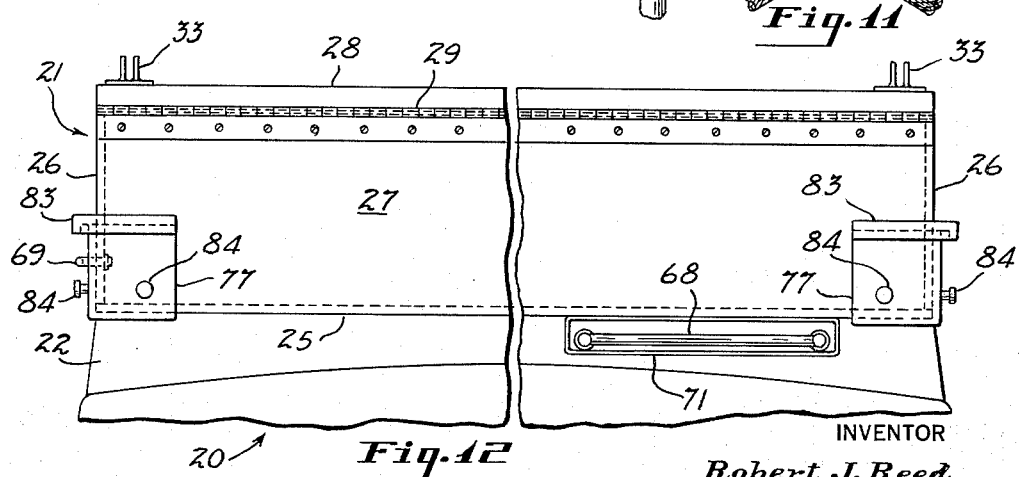
INVENTOR
Robert J. Reed
BY
ATTORNEYS

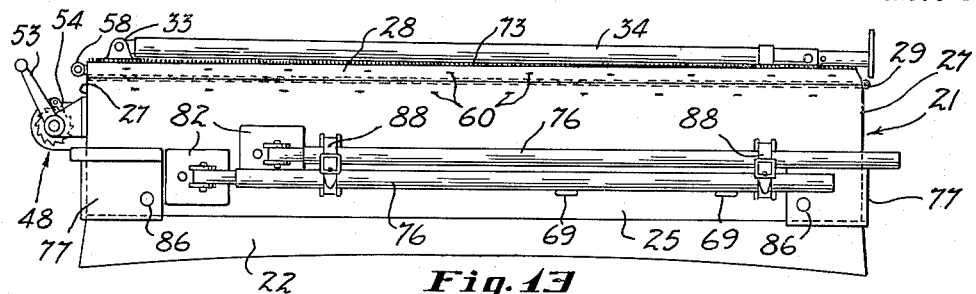
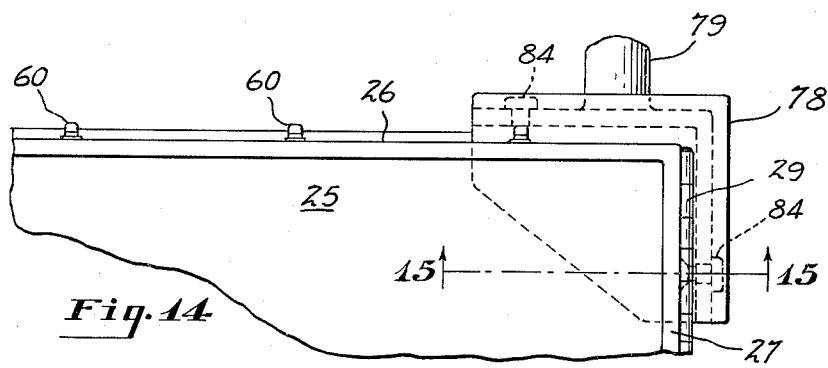
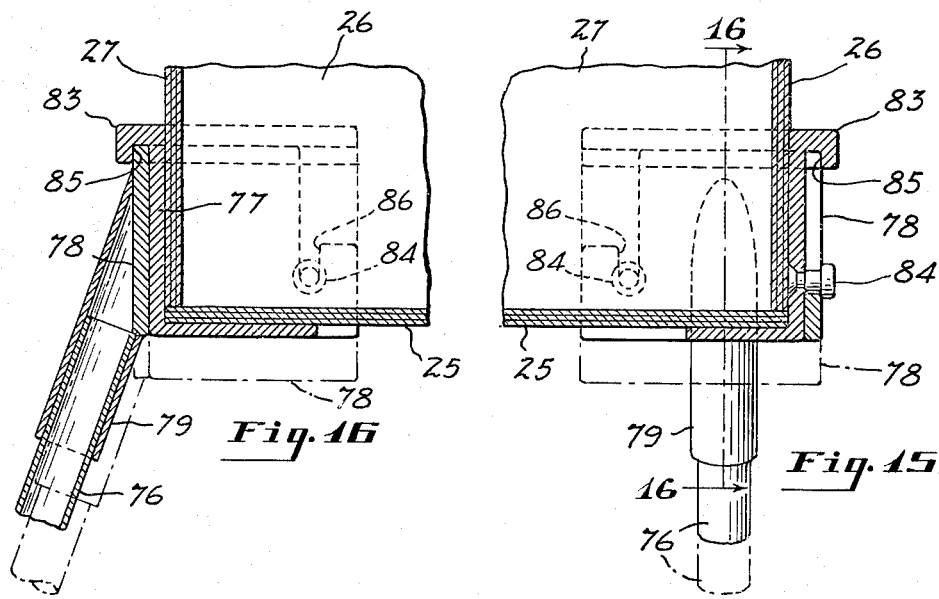

United States Patent Office 3,202,159
Patented Aug. 24, 1965

3,202,159
CAR-TOP TENT STRUCTURE
Robert J. Reed, Lakewood, Ohio
(815 Boston Post Road, Rye, N.Y.)
Filed June 4, 1962, Ser. No. 199,794
4 Claims. (Cl. 135—1)

This invention relates to car-top tent houses adapted to be carried in a closed condition on the top of a passenger automobile and to be opened to provide commodious living and sleeping quarters.

The principal objects of the invention are to provide a car-top tent house which closes into a substantially rectangular, relatively shallow box assembly suitable for being carried on the top of a passenger automobile while traveling, and which opens to form living quarters above the car top with a cantilever floor extending rearwardly for extending the useable floor area above the car top and for supporting a ground level enclosure behind the car.

Another object of the invention is to provide a car-top tent house of the foregoing character which is capable of being constructed of lightweight materials while still providing ample strength and stability when opened for use.

Another object of the invention is to provide a car-top tent house of the foregoing character which, after being opened for use, can be raised on strong and rigid supporting legs capable of being adjusted to uneven terrain and supporting the assembly in a stable manner so that the automobile on which the assembly is carried may be driven away while leaving the assembly open for use or still closed, as may be desired.

Still another object of the invention is to provide a car-top tent house of the foregoing character which is easily and quickly openable for use and closable for travel, and which can be easily and quickly raised off the automobile in either its open or closed condition.

The foregoing objects of the invention will be better understood and additional objects and advantages of the invention will become apparent in the course of the following description thereof and from the accompanying drawings. By way of generalization, these objects and attendant advantages of the invention are accomplished in an efficacious and economical manner by two features that principally characterize the invention and lend themselves to many variants to suit the desires of users of the invention. One of these features involves a generally rectangular car-top box and rearwardly opening top closure panel that swings out to a horizontal position from the rear end of the box, and a collapsible strut framework and tent fabric enclosure for supporting the top panel in its opened position so as to provide a usable, upper level, living or sleeping area having twice the floor area of the box itself. The other of these features involves a second tent fabric that may be removably attached to and supported along the side and rear edges of the top panel to form a three-sided enclosure on the ground level that encloses the rear end of the automobile and a sizeable area behind it for use as additional living or sleeping quarters.

According to a preferred form of the invention, it also involves detachable legs for raising and supporting the box above the top level of the automobile so that the automobile may be driven away after the tent house has been opened for use or, if desired, while it is still closed. These detachable legs are extensible to accommodate uneven terrain and, when detached, may be readily stored inside of or along outside surfaces of the closed assembly while traveling.

Based upon the foregoing principal features of construction, a number of additional features are provided, as will be explained hereinafter, which contribute to the overall desirability of the device of the invention as transportable shelter for campers and travelers.

In the accompanying drawings:

FIGURE 1 is a perspective view of an embodiment of the invention mounted on the top of a station wagon type of passenger automobile (shown in phantom outline) and opened for use while still supported thereon, and with four detachable side legs in position for raising the assembly upwardly off of the car in the event removal of the car should be desired;

FIG. 2 is an enlarged front elevational view of the device of FIG. 1;

FIG. 3 is a similarly enlarged side elevational view of the device of FIG. 1;

FIG. 4 is a further enlarged, fragmentary, vertical sectional view of the device of FIGS. 1–3, taken as indicated by the line 4—4 of FIG. 3;

FIG. 5 is a fragmentary, vertical sectional view, on the scale of FIG. 4, showing certain details of a winch mechanism mounted on the front end wall of the box assembly of FIGS. 1–3, the view being taken as indicated by the line 5—5 in FIG. 2;

FIG. 6 is a fragmentary side elevational view on a still further enlarged scale, taken as indicated by the line 6—6 in FIG. 4 and showing the mode of attachment of the lower, ground level, fabric enclosure to the upper tent fabric about the side and rear edges of the top panel of the box assembly after it has been opened to the condition shown in FIGS. 1 and 2;

FIG. 7 is a side elevational view similar to FIG. 3, showing the device of FIGS. 1–3 in the process of being closed while supported by the automobile and after detachment of the pair of detachable rear end legs (the automobile itself being omitted);

FIG. 8 is a fragmentary, vertical sectional view, on the scale of FIG. 6, showing how the top panel of the device of FIGS. 1–3 closes with the upper tent fabric and its supporting truss structure collapsed and disposed in the box, the view being taken as indicated by the line 8—8 in FIG. 7;

FIG. 9 is an enlarged, fragmentary, perspective view of a portion of truss structure that supports the upper tent fabric (which has been removed for clarity of illustration);

FIGS. 10 and 11 are further enlarged, vertical sectional views of portions of the truss structure of FIG. 9, respectively taken as indicated by the lines 10—10 and 11—11 in FIG. 9;

FIG. 12 is an enlarged, rear elevational view of the device of FIGS. 1–3 when closed for traveling and showing, among other details, one manner of storing the ladder shown in FIGS. 2 and 3;

FIG. 13 is a side elevational view, on a somewhat enlarged scale, of the device of FIGS. 1–3 when closed for traveling and showing, among other features, certain details of the crank and ratchet mechanism used as an aid in closing the device, and also showing the manner of storing the six side and rear legs;

FIG. 14 is a fragmentary plan view on an enlarged scale of a corner of the opened box assembly with the upper tent fabric removed, showing certain details of the mode of attachment of the removable side legs;

FIG. 15 is a fragmentary, vertical sectional view of the structure shown in FIG. 14, taken as indicated by the line 15—15 in FIG. 14; and FIG. 16 is a fragmentary, vertical sectional view of the structure of FIG. 14, taken as indicated by the line 16—16 in FIG. 15.

Referring particularly to FIGS. 1 and 2, a device illustrative of the present invention is shown in an opened condition for use while mounted on the roof of a typical station wagon 20 (shown in phantom outline). This illustrative device comprises a rectangular box assembly, generally designated 21, supported on a cushion 22 that may suitably be made of a plastic or synthetic resin sponge material molded to provide a lower surface conforming to the contour of the roof of the station wagon and a top surface that, when loaded, will be substantially flat and give substantially uniform support over all parts of the surface of the box assembly 21 resting thereon. In other words, the upper surface of the cushion 22, when in an unloaded condition, may be slightly concave so that the weight of the box will compress the thicker portions of the cushion somewhat more than the thinner portions and provide the desired uniform support over the bottom surface of the box assembly.

The box assembly 21 may suitably be secured against movement on the car top by any desired number of clamps 23 distributed along both sides of the box assembly for hooking under and pulling against the conventional gutter molding normally extending along the side edges of automobile roof panels.

The box assembly 21 may suitably comprise a flat bottom wall 25, a pair of side walls 26, a pair of end walls 27, and a rigid top panel 28 hingedly connected to the rear end wall 27 along its upper edge, preferably by means of a continuous "piano hinge" 29 shown in more detail in FIG. 12. The bottom, side, and end walls 25, 26, and 27 may be made of separate plywood panels or the like, suitably secured together at their meeting edges to form an upwardly opening box structure; or the entire box structure, including these bottom, side and end walls, may be molded or otherwise formed as a unitary structure from fiber-reinforced plastic, sheet metal, or the like, with or without added or integrally formed reinforcing ribs, strips, or the like, to add rigidity. The top panel 28, however, being intended to serve as a load-bearing floor when swung to its open condition, is suitably of a more rigid construction, such as a so-called "hollow core" panel having a plurality of inner frame members 31 (only two being shown in FIG. 8) suitably distributed and sandwiched between a pair of plywood sheets 32 or other similarly rugged sheet material.

At the free corners of the top panel 28, at the rear thereof when the panel is in its open condition, a pair of brackets 33 are respectively mounted, and a pair of extensible rear end legs 34 are preferably removably secured to the brackets 33 in any desired manner for removal and storage when not in use. Alternatively, the extensible legs 34 may be hingedly connected to the bracket 33 for swinging movement in vertical planes extending longitudinally of the top panel 28 so that these legs will extend along such planes and will lie flat upon the top panel when it is swung into its closed position (FIG. 13).

Covering the entire box assembly, including the top panel 28 when in its open condition shown in FIGS. 1 and 2, is a foldable fabric or other suitably flexible sheet material 36 tailored to form a tent extending above the box assembly and adapted to be folded within the box assembly when the top panel 28 is swung to its closed position (FIG. 8). This tent fabric is supported by a plurality of generally U-shaped, preferably tubular, arch-frames 37, 38, and 39, each having its opposite ends flattened and respectively pivotally connected to opposite sides of the box assembly for swinging about axes parallel to the hinge axis of the top panel hinge 29. These arch-frames are proportioned and connected to the box assembly adjacent the rear end wall 27 thereof for swinging from angularly diverging, generally upwardly arched positions when the top panel is in its open position (FIG. 3) to lowered positions in which the arch-frames are disposed entirely within the box assembly when the top panel 28 is in its box closing position (shown in dotted lines in FIG. 7). In the present embodiment of the invention, three such arch-frames are sufficient to support the illustrated tent, one of the arch-frames 37 being pivotally connected to the side walls 26 of the box itself, and the other two arch-frames 38 and 39 being pivotally connected brackets 41 respectively mounted on the top panel 28 adjacent opposite ends of the hinge 29, but spaced slightly inwardly with respect thereto so as to fit inside the box between the side walls 26 thereof when the top panel 28 is in its closed position.

The arch-frame 37–39 cooperate with suitable set of interconnecting lengths of cord, wire, or cable to provide a truss structure supporting the top panel 28 in its horizontally extending, open position until the extensible rear end legs 34 can be properly set to provide ground support for the rearwardly extending end of the top panel. A suitable arrangement of tension cords or the like for this purpose may include one or more sets of such cords, for example, one set adjacent each side of the truss structure. The cords of each such set may include a first cord 42a having one end secured in any desired manner inside the box to the front end panel 27 and its opposite end secured to the arch-frame 37; a second tension cord 42b having one end secured to the arch-frame 37 and its opposite end secured to the arch-frame 38; a third tension cord 42c having one end secured to the arch-frame 38 and its opposite end secured to the arch-frame 39; and a fourth tension cord 42d having one end secured to the arch-frame 39 and its opposite end secured in any desired manner to a free corner of the top panel 28. Each of these tension cords serves to limit the opening swinging movement of one of the arch-frames to which it is attached or to limit the opening swinging movement of the top panel 28 to the positions of these parts best shown in FIG. 3, while permitting all of these parts to swing back into their closed positions shown in FIG. 7. Although the tent fabric 36 may constitute a part of the resulting truss structure and will inherently so function in the event of slippage or failure of any of the tension cords 42, all of the forces extending longitudinally of the assembly from the rear end of the opened top panel 28 over the tops of the arch-frames 39, 38, and 37 successively, and down to the inner surface of the front end wall 27 of the box, are preferably normally resisted substantially entirely by the set or sets of tension cords 42a–42d.

Suitable attachment of the tension cords 42a–42d to the arch-frames 37–39 may be provided in a simple manner, as shown in FIG. 10, one such attachment to the arch-frame 38 being illustrated therein. This attachment may include a carriage bolt 43 extending downwardly entirely through the horizontal reach of the arch-frame 38, with the lower end of the bolt being threaded into a boss integrally formed in a ring 44. Tension cords 42b and 42c may simply be tied to opposite sides of this ring, as shown. The rounded and countersunk head of the carriage bolt 43 will provide a smooth upper surface on the top side of the arch-frame so as to minimize any tendency to abrade the tent fabric, which slides and is stretched taut thereover in its opened condition. The ring 44 may be tightened on its carriage bolt so as not to be readily unscrewed, but, in any event, the tension cords will normally restrain accidental unscrewing of the ring from the carriage bolt.

As an aid in closing the assembly described above, a winch cord 46 may be secured in any desired manner to the opened top panel 28 adjacent the rear edge thereof and successively run freely through suitable guide brackets mounted on the arch-frames 39, 38, and 37, and onto a winch assembly, generally designated 48, that may be mounted on the front end wall 27 of the box. The winch cord 46 may run to the winch mechanism 48 through an aperture 49 in the front end wall 27 to a winch drum 51 mounted on a shaft 52 and provided with a crank handle 53 at one end thereof. To permit the winch cord 46 to move laterally while winding in successive turns onto and off the drum 53, the aperture 49 in the front end wall 27 is horizontally elongated to be substantially coextensive with the axial length of the drum. The winch shaft 52 may be mounted on the front end wall 27 on suitable brackets for manual rotation by means of the crank handle 53. A ratchet mechanism 54 having a one-way pawl, adapted to be swung into and out of operative position in a known manner, is preferably provided on the shaft 52 for restraining reverse movement thereof while the box assembly is being pulled closed to prevent accidental dropping of the top panel 28 during the upwardly swinging stage of its closing movement.

Instead of being mounted on the exterior of the front end wall 27, the winch mechanism 48 may obviously be mounted on the interior. Or if mounted on the exterior as shown, the winch may be enclosed with a housing (not shown) which, for better appearance, may be faired into the box surfaces and produce the effect of a streamlined front end wall.

Suitable guide brackets on the arch-frames 37-39 for the winch cord 46 may comprise additional rings 56, identical with the rings 44 for securing the tension cords 42a-42d, but turned at right angles thereto and held by additional carriage bolts 43, as shown in FIG. 11. The winch cord 46 may run freely through the rings 56 as the box assembly is being opened and closed.

Opening of the entire assembly can be readily accomplished by a single person by first standing on the rear bumper of the station wagon 20 and pulling the top panel 28 upwardly to a vertical position by means of a rope 57 (FIG. 7) removably secured by a suitable snap-fastener (not shown) to a bracket 58 mounted on the free end of the top panel. Lowering of the top panel to its fully opened position will then be accomplished by gravity while manually holding it back sufficiently to prevent its dropping forcibly. In the event such final opening movement is unduly restrained by folds in the tent fabric, or by other causes, the rope 57 may be used to pull the top panel downwardly to its fully opened position. In order not to hang obtrusively at the front of the box assembly when closed for traveling, or at the rear of the box assembly when opened for use, the rope 57 may be removed and stored when not needed.

Closing of the entire assembly can also be accomplished by a single person, although the assistance of a second person standing on the opposite side of the assembly for tucking in folds of the tent fabric during the closing operation renders the operation more efficient. By opening the front left-hand door of the station wagon 20 and standing on the door sill while turning the crank handle 54 with the left hand, one person may readily pull the top panel upwardly toward its closed position, using the right hand to tuck the tent fabric inwardly between the arch-frames 37-39 until the top panel 28 reaches approximately a vertical position. The top panel can then be grasped by the right hand and gently lowered while continuing to tuck in the tent fabric with the left hand. Any additional inward tucking of the tent fabric that may still be required around the front and two sides of the assembly may readily be accomplished by manually lifting the top panel 28 with one hand sufficiently for this purpose, while tucking in the tent fabric with the other hand. Thereafter, cranking the winch 48 will take up the slack in the winch cord 46, and the ratchet will hold the cord taut.

The tent fabric 36 is tailored to form a bag which, in its applied condition over the open box assembly, opens downwardly with its lower peripheral edge surrounding three sides of both the box itself and of the top panel portion of the box assembly, to which it may be removably secured. Such securement is desirably accomplished with twistable stud fasteners 60 mounted at spaced intervals about the periphery of the open box assembly for coaction with similarly spaced grommets or eyelets 61 secured in the tent fabric adjacent the lower edge thereof about its periphery (FIG. 6), as is common in securing the edges of canvas to rigid structures.

As shown in FIG. 8, when the top panel 28 is in its box closing position, the tent fabric 36 extends in two adjacent layers between the top panel 28 and the upper edges of the side panels 26 and front end panel 27 of the box, thus providing a dust seal when the box assembly is closed that will prevent dust that may sift between the two adjacent layers of fabric (along what is the outside surface of the fabric in its unfolded condition) from working its way into the inside of the tent. Both to protect the tent fabric from undue abrasion where it is sandwiched in a double layer between the top panel 28 and the side and front end walls of the box, it may be desirable to provide a soft rubber gasket strip 62 along the top edge of the side and front end panels and another similar gasket strip 63 along the mating surface of the top panel 28 adjacent the edges thereof, as illustrated in FIG. 8. Continuing both of these gaskets 62 and 63 along the top edge of the rear end wall 27 of the box and along the mating portion of the top panel 28, respectively, will also provide a seal along this fourth side of the closed box assembly. The two peripheral gaskets may be compressed to provide a reliable seal about all four sides of the closed box assembly by providing any desired type of toggle clamps or the like (not shown) to pull the top panel 28 snugly down to its fully closed position.

Access into the tent provided by the open box assembly is conveniently afforded by an opening formed in one side of the tent which may be closed by an integrally formed door flap 64. Sealing of this flap about its free edges to the surrounding tent fabric for closing the tent opening against wind and rain is suitably accomplished by a pair of conventional slide fasteners, each having a pair of mating stringers engaged and disengaged by a slider. One of these slide fasteners 66 runs down one side of the flap and horizontally along its bottom edge to the center thereof. The other slide fastener runs similarly from the top of the opposite side of the flap. As is common in tent constructions, pull-strings on the sliders of the two slide fasteners may extend both inwardly and outwardly of the tent for operation from the inside or the outside.

In order to climb up to the opening in the side of the tent above the roof of the station wagon, a removable ladder 68 is preferably provided which may be of any desired extensible type to accommodate uneven terrain while always reaching upwardly to the same level adjacent the upper edge of the box side wall 26. The upper end of the ladder may, if desired, be provided with hooks or the like to engage in cooperating brackets 69 on the box side wall 26 for removably holding the ladder in place. The ladder is desirably made extensible to a degree by forming each side rail of the ladder from a pair of telescopingly engaged tubes, as indicated in FIG. 3, so that the lower section of the ladder may be extended or retracted within limits to accommodate uneven terrain while the upper section of the ladder hangs on the brackets 69.

The ladder 68 may suitably be stored within a pocket in the cushion 22 which preferably opens rearwardly, as shown in FIG. 12, and is lined with a sheet metal wall 71 as shown. Thus, the ladder may simply be slid endwise into this pocket for storage while traveling. Any desired closure or fastener (not shown) may be added to hold the ladder in place in the pocket and to close the opened end of the pocket if desired. Obviously, the sheet metal liner 71 may be interiorly padded to minimize rattling of the stored ladder while traveling.

After the above-described box assembly has been opened to provide a tent house above the level of the roof of the station wagon 20, and after the rear end legs 34 have been set in place, the ground level enclosure shown in FIGS.

1-3 may be assembled by securing a second tent fabric 72 or the like along the rear edge of the opened top panel 28 and along both side edges thereof. This securement is preferably accomplished by stitching stringers 73 and 74 (FIG. 6) of a conventional slide fastener to the lower edge of the upper tent fabric 36 and to the upper edge of the lower tent fabric 72, respectively.

The lower tent fabric 72 is suitably tailored to extend outwardly and downwardly to the ground, as shown, and may be staked securely to the ground at intervals about its periphery, as shown at 75 in the drawings. This provides a ground level enclosure of substantial area at the rear end of the station wagon. Obviously, the sides of this enclosure may be extended forwardly along the sides 26 of the box as far as desired and may also have end closure flaps (not shown) extending inwardly to the sides of the station wagon to provide a more completely enclosed room. In this latter event, it will also be apparent that any conventional form of entrance flap arrangement (not shown) may be provided in the tent fabric 72 to provide access to the room enclosed thereby.

Referring now to the illustrated leg assembly for lifting and supporting the box assembly 21 independently of the automobile 20 (after releasing the clamps 23), so as to permit the automobile to be driven away, this structure is shown ready for use in FIGS. 1–3, and the various details thereof are best shown in FIGS. 12–16. In this leg assembly, four telescopically extensible side legs 76 are removably secured, respectively, to the four lower corners of the box assembly by means of rigid corner members 77 permanently attached to and fitting over the lower corners of the box assembly, and by means of cooperating, detachable, corner brackets 78. The corner brackets 78 have sleeves 79 rigidly formed thereon for telescopically receiving the upper ends of the side legs 76, after which these corner brackets may be engaged with and firmly, but detachably, locked against the corner members 77 on both sides of the corresponding corners of the box. The side legs 76 include lower telescopic extensions 81 having foot plates 82 pivotally connected to the lower ends thereof, thereby making the lower ends of the side legs adjustable to uneven terrain while providing lower end surfaces of substantial area which will support the entire structure without sinking into the ground because of the weight imposed thereon.

Each corner member 77 includes three right angularly related side wall and bottom wall portions integrally formed into a rigid unit, as best shown in FIGS. 14–16, and the side wall portions have outwardly and downwardly projecting flanges 83 running continuously along the upper edges thereof and intersecting at right angles at the juncture thereof. A pair of pins 84 having heads on the outer ends thereof are respectively rigidly mounted on the side wall portions of the corner member, well below the flanges 83 thereof, so as to project outwardly therefrom.

Each corner bracket 78 includes a pair of right angularly related side wall portions (but no bottom portion) integrally joined and adapted to fit against and conform to the side wall portions of the cooperating corner member 77 and to be received within the right angularly related grooves formed by the flanges 83 on the corner member. Parts of the side wall portions of each corner bracket 78 are cut away, as most clearly shown in FIGS. 3 and 16, to provide notches 86 into which the pins 84 of the cooperating corner member will slide with the heads of the pins snugly engaging the outer surfaces of the corner bracket. The corner bracket side portions are also cut away at their upper outer corners to facilitate positioning the corner bracket against the cooperating corner member 77 in a lowered position relative thereto (indicated in phantom outline in FIGS. 15 and 16), whereupon upward movement of the corner bracket will cause the pins 84 to slide into the notches in the corner bracket while the upper edges of the corner bracket slide into the grooves defined by the flanges 83. This rigidly locks the associated side leg 76 to the box assembly with the desired downward and outward inclination for supporting the box assembly with good lateral stability.

As each of the side legs 76 is positioned and locked in place in the foregoing manner, it is manually lifted enough to raise the adjacent corner of the box assembly a couple of inches or so above the roof of the automobile 20, while permitting the lower extension 76 of the side leg to extend a corresponding additional amount. While so lifting the leg 76, a pin 86 is slid into place through the uppermost exposed one of a series of apertures 86a (FIG. 2) that are drilled through the leg extension for this purpose. The pin 86 thus carries the load transmitted to the side leg 76 and holds the leg in its extended condition. This operation is performed on each of the side legs 76 in turn, working around the assembly in either a clockwise or counter-clockwise direction; and such operation may be performed with or without first opening up the box assembly and thereby erecting the upper tent structure.

Each of the side leg extensions 81 may be rotatably adjusted about its axis so that its foot plate 82, with its pivotal action, will rest flat on the ground regardless of differences in the direction and degree of ground slope. In order to prevent sliding of the foot plates 82 along the ground, they are desirably provided with integrally formed, downwardly projecting, hardened and pointed spikes 87 on their lower surfaces. The spikes 87 will penetrate soft earth or grip anything but the smoothest of rock surfaces sufficiently for serving their stated function.

Leveling of the assembly when it is supported by the side legs 76 may also require readjusting the rear end legs 34 after the assembly has been raised up above the roof level of the automobile. Some added stability is provided against swaying of the assembly in a forward direction only by the subsequent staking of the lower fabric enclosure 72 to the ground at the points 75, but it will normally be desirable not to rely upon such stabilizing effect as this may provide. Accordingly, at least one pair of fore and aft guy ropes, preferably at diagonally opposite corners of the assembly, may be attached thereto and anchored some distance outwardly from the assembly to suitable ground stakes, to surrounding trees, or to other anchoring points which the camp site area may provide. For simplicity, these guy ropes and their mode of attachment have been omitted from the drawings. Alternatively, of course, the pairs of side legs 76 on either side of the assembly may be provided with detachable diagonal braces (not shown) interconnecting the legs of each pair to provide increased fore and aft stability.

The procedure for lowering the assembly back onto the roof of the automobile is essentially the reverse of the above-described procedure for raising it. When the side legs 76 have been detached, the corner brackets 78 are removed for storage inside the box or elsewhere as desired. With or without removal of the foot plates 82 on the leg extensions 81, the side legs are telescoped to their shortest lengths by relocating the pins 84. If desired, the upper portions of the side legs 76 may each be provided with an aperture therethrough (not shown) mating with one of the series of apertures in the leg extension, whereby the pin 84 may be passed through the two fully telescoped parts to lock them in their fully telescoped relationship.

The removed and fully telescoped side legs 76 may then be strapped in pairs onto opposite sides of the box assembly for storage while traveling, as shown in FIG. 13. For this purpose, a pair of straps 88 may be mounted on each side wall of the box assembly with suitable cooperating buckles and mounting brackets, not shown in detail and omitted from the other figures of the drawing for simplicity. If the rear end legs 34 are to be left attached to the upper panel 28 of the box assembly when in its closed position, they may be similarly strapped adjacent the lower free ends thereof to the top panel 28, as also shown in FIG. 13.

From the foregoing description of an illustrative embodiment of the invention, it will be appreciated that innumerable structural variations of the particular embodiment disclosed may be made by those skilled in the art within the teachings of this disclosure or without departing from the scope of the invention as defined in the appended claims. It will also be appreciated from the foregoing description of the invention and the manner in which it is used, that the various objects of the invention set forth above herein have been achieved with numerous advantages over prior car-top tent structures heretofore known.

What is claimed is:

1. A car-top tent house comprising a generally rectangular box assembly having a bottom, pairs of side and end walls, and a rigid top panel hingedly connected along one end thereof to one of said end walls for swinging movement from a box closing position through 180° to an open position extending horizontally outwardly from one end of the box, a plurality of generally U-shaped arch-frames each having its opposite ends respectively pivotally connected to opposite sides of said box assembly for swinging about an axis parallel to and closely adjacent the hinge axis of said top panel and said one end wall, said arch-frames being proportioned for swinging from angularly diverging, generally upwardly arched positions when said top panel is in said open position to lowered positions inside of and below the upper edges of said box assembly when the top panel is in said box closing position, and a foldable fabric tailored to form a tent supported on and conforming to said arch-frames in their upwardly arched positions when said top panel is in said open position, said tent having a lower end wall and side wall periphery extending along and secured to the periphery of said box assembly when the top panel is in its open position for enclosing the upper surfaces of the entire box assembly in that condition with a continuous end and top portion of the tent fabric extending under tension from its peripheral securement to the other end wall of said box assembly, over each of its diverging arch frames, to its peripheral securement to the end of said top panel opposite the hinged end thereof for at least partially supporting the top panel in its open position and preventing sagging of the top portions of the tent between said arch frames.

2. A tent house according to claim 1, including tension cord means limiting the swinging movement of said arch-frames from their lowered positions to predetermined maximum angles of divergence in their generally upwardly arched positions, said tension cord means comprising at least one series of interconnected tension cord segments secured at opposite ends of the series to said top panel and to an end wall of said box assembly at opposite ends of the assembly when the top panel is in its open position, said cord segments also being secured to and bridging said arch-frames adjacent the tops of their arches and coacting therewith to form a truss supporting said top panel in its horizontally extending open position.

3. A tent house according to claim 1, including means for releasably securing said assembly on a car roof, four brackets respectively secured to walls of said assembly adjacent the four corners thereof, and four legs removably secured at their upper ends to said brackets, respectively, and extending outwardly and downwardly therefrom into engagement with the ground, said legs having feet at their lower ends providing ground-engaging surfaces of substantial area, and means for adjusting the lengths of said legs to support said assembly independently of a car roof on which it has been releasably secured and supported for permitting removal and replacement of the car while said assembly is in its open condition and independently supported by said legs.

4. A car-top tent house according to claim 1, including a tension cord secured at one end to the free end of said top panel and extending through guides on said arch-frames adjacent the tops of their arches, the opposite end of said tension cord extending to a point adjacent the end wall of the box assembly opposite the end wall to which said top panel is hinged, and a winch mounted on the box assembly adjacent the end thereof opposite the end to which the top panel is hinged, said tension cord being operatively connected to said winch to be wound thereon for pulling said top panel to its closed position and thereby swinging said arch-frames to their lowered positions.

References Cited by the Examiner

UNITED STATES PATENTS

| | | | |
|---|---|---|---|
| 2,222,636 | 11/40 | Strauss | 135—5 |
| 2,683,265 | 7/54 | Wayne | 135—1 |
| 2,710,977 | 6/55 | Fannin | 135—1 |
| 2,826,210 | 3/58 | Heil | 135—4 |
| 2,835,262 | 5/58 | Collins | 135—1 |
| 3,009,471 | 11/61 | Rossiter | 135—5 |
| 3,021,852 | 2/62 | Hoffman | 135—1 |

FOREIGN PATENTS

| | | |
|---|---|---|
| 513,613 | 6/55 | Canada. |
| 522,884 | 6/40 | Great Britain. |

HARRISON R. MOSELEY, *Primary Examiner.*